E. A. BYRNES, DEC'D.
A. S. BYRNES, ADMINISTRATRIX
ELECTROLYTIC PROCESS OF AND APPARATUS FOR PRODUCING COMPOUNDS.
APPLICATION FILED JULY 25, 1903. RENEWED MAR. 9, 1910.
1,102,209.
Patented June 30, 1914.
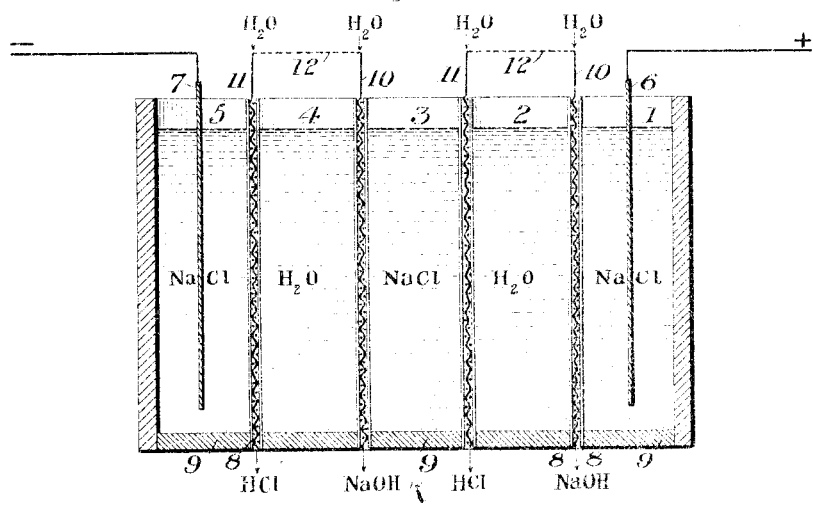
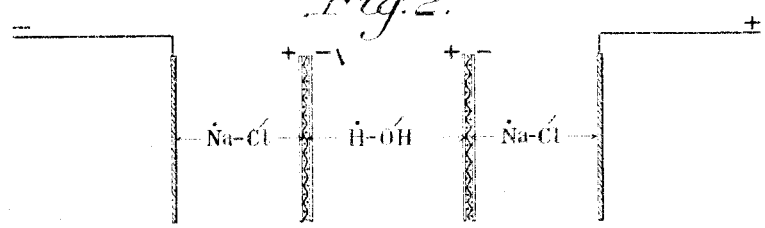
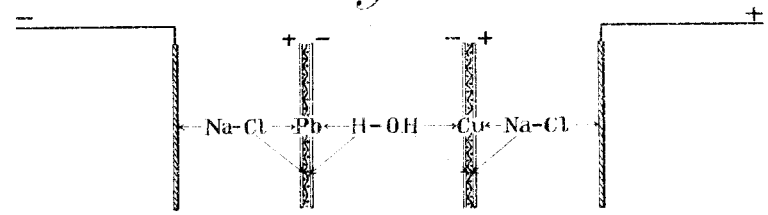
Witnesses
R A Balderson
J. B. Hill
Inventor:
Eugene A. Byrnes,
by Byrnes & Townsend,
Attys.

UNITED STATES PATENT OFFICE.

EUGENE A. BYRNES, OF WASHINGTON, DISTRICT OF COLUMBIA; ALICE S. BYRNES ADMINISTRATRIX OF SAID EUGENE A. BYRNES, DECEASED.

ELECTROLYTIC PROCESS OF AND APPARATUS FOR PRODUCING COMPOUNDS.

1,102,209.     Specification of Letters Patent.     Patented June 30, 1914.

Application filed July 25, 1903. Serial No. 167.022. Renewed March 9, 1910. Serial No. 548,266.

*To all whom it may concern:*

Be it known that I, EUGENE A. BYRNES, a citizen of the United States, residing at Washington, in the District of Columbia, have invented certain new and useful Improvements in Electrolytic Processes of and Apparatus for Producing Compounds, of which the following is a specification.

This process and apparatus are especially designed for the electrolysis of alkali metal salts and the production therefrom of the corresponding hydroxids and acids.

In carrying out the invention, both ions of the salt are combined at the electrodes, directly or indirectly, with other substances, radicals, or ions, which are preferably derived from the electrolysis of another compound. For example, sodium chlorid may be electrolyzed and the sodium combined at the cathode with hydroxyl or oxygen produced by the electrolysis of water and the chlorin may be combined at the anode with hydrogen, also derived from water. This result may be effected by passing an electric current successively through adjacent and alternate bodies of a solution of the salt to be decomposed and water, under such conditions that the cation of the salt may combine with the hydroxyl of the succeeding body of water, and the hydrogen of that body of water with the anion of the succeeding salt solution. In order that the positive and negative ions of the adjacent bodies of salt solution and water may thus be combined, it is obvious that both of these ions should discharge upon a common electrode, serving both as the cathode of one body of electrolyte and as the anode of the other body of electrolyte, that is a bipolar electrode. This electrode should also be of such a character that the ions or the products due to their action upon the electrode may be able to meet and react upon each other, that is the electrode should be porous. Finally, in order that the new product or products due to the combination of the ions from the adjacent unlike electrolytes may be separately recovered, each electrode should be separated from each of the adjacent electrolytes by a diaphragm and some outlet provided for the product from the space between the diaphragms.

One apparatus which satisfies the specified conditions and by which the process may be carried out is shown in the accompanying drawings, in which:

Figure 1 is a vertical, longitudinal section through the electrolytic cell; Fig. 2 is a diagram illustrating the reactions within the cell when the ions of the adjacent electrolytes are directly combined; and Fig. 3 is a similar diagram illustrating the reactions when the ions are indirectly combined through the medium of a substance capable of successive oxidation and reduction by the anions and cations.

The cell shown in Fig. 1 comprises a series of narrow, vertical compartments 1, 2, 3, 4, 5, extending transversely across the cell, each alternate compartment containing a body of the salt solution and the intermediate compartments containing bodies of water, or other compound whose ions are to be combined with those of the salt. A body of an aqueous sodium chlorid solution is shown in compartments 1, 3 and 5, and a body of water in the intermediate compartments 2 and 4. Compartment 1 receives the anode 6 and compartment 5 the cathode 7, both connected to the external source of electric current. Between each pair of compartments is a transverse, vertical electrode, 10 or 11, shown as of wire gauze. Each face of each electrode is separated from the adjoining electrolyte by a diaphragm 8. Each pair of diaphragms, with its intermediate electrode, is preferably clamped between insulating frames 9, constituting the side walls and bottom of each compartment. The electrodes 10 between compartments 1 and 2 and 3 and 4 may here consist of some metal which is inert toward hydroxyl, sodium and sodium hydroxid, such as platinum or bright nickel. They may also consist of vertical rods of carbon or of a mass of broken carbon or magnetite. The electrodes 11 between compartments 2 and 3 and 4 and 5 may here consist of a metal which is inert toward chlorin, hydrogen and hydrochloric acid, such as platinum. They may also consist of vertical rods of carbon or of a mass of broken coke or magnetite or of platinized asbestos. Assuming that some source of electric current is now connected to the terminal anode and cathode and that each intermediate electrode is bipolar, receiving the entire current on its cathode face and giving it up from its anode face, sodium ions from compartment 1 and hydroxyl ions from compartment 2 will discharge upon the intermediate electrode 10 and combine to form sodium hydroxid, which may be washed downward and out from the space between the diaphragms 8 by water introduced from above. The hydrogen from the water in compartment 2 and the chlorin from the brine in compartment 3 will also simultaneously discharge upon the intermediate electrode 11 and combine to form hydrochloric acid, which may be likewise washed out by water. The anions and cations of the salt and water will thus be electrolytically exchanged. These reactions are diagrammatically shown in Fig. 2. It is not essential, however, that the electrodes should be inert toward the ions. They may consist of a metal which will undergo alternate oxidation by the anion and reduction by the cation, the combination of these ions being thus indirectly effected. For example, the electrodes 10 between compartments 1 and 2 and 3 and 4 may consist of oxidized nickel or copper, or of a mixture of broken carbon and a hydrated oxid of nickel or copper or finely divided mercury. The electrodes 11 between compartments 2 and 3 and 4 and 5 may consist of lead or silver, or of a mixture of broken carbon and finely divided lead, silver or mercury, or of particles of carbon coated with these metals. The reactions occurring in the cell when such electrodes are employed are indicated in Fig. 3, the copper electrode being oxidized by the hydroxyl and again reduced by the sodium ion, with production of sodium hydroxid, while the lead electrode is chloridized and again reduced by the hydrogen ion, with the production of hydrochloric acid. These products may be washed out of the cell by water, as described.

In some cases, each electrode may consist both of a material which is inert toward the ions and of a material which will be subject to oxidation and reduction by the ions, for example, a mixture of broken carbon or magnetite and an oxidizable metal, either finely divided or as a sheet of gauze, embedded in the broken material.

In practice, neither a sheet of wire gauze nor a mass of broken conductive particles constitutes an effective bipolar electrode, a considerable portion of the current shunting through the electrolyte instead of causing the discharge of ions upon the electrode surfaces. To obtain a high current efficiency, it is necessary to provide connections by which the entire current may be utilized to discharge the ions of each body of salt solution. This may be effected by short circuiting the electrodes at each side of the compartments 2 and 4, as indicated by the dotted lines 12. The current then shunts around the bodies of water or other electrolyte in these intermediate compartments. The sodium and chlorin set free in the electrodes, however, with the intermediate body of water, constitute a voltaic cell, the hydroxyl of the water oxidizing the sodium while its hydrogen combines with the chlorin. The action of each of these voltaic cells therefore tends to destroy the polarization produced by the sodium and chlorin in the electrolyzing compartments containing the salt solution, thus utilizing the energy of the free sodium and chlorin to reduce the required potential difference of the current applied to the terminal electrodes. An electric current from an external source may also be passed alternately, at brief intervals, through the alternate compartments, that is, first those containing the salt solution and then through those containing the water.

When water occupies the compartments between those containing the salt solution, the total result effected may be termed an electrolytic hydrolysis of the salt. Other products may be obtained by replacing the water with suitable electrolytes. For example, a solution of chromic acid may be placed between the bodies of sodium chlorid solution, the products then being sodium chromate and hydrochloric acid.

While the process has been described in connection with aqueous solutions and water, it may also be applied to molten electrolytes, by employing diaphragms and electrodes which will resist the action of the fused compounds and their products. The heat necessary to effect fusion may be derived from the electrolyzing current.

I claim:

1. The electrolytic process of producing compounds, which consists in discharging ions of adjacent electrolytes upon an intermediate electrode, combining the electrolytic products, and separating the resulting compound from both electrolytes, as set forth.

2. The electrolytic process of producing compounds, which consists in discharging ions of adjacent electrolytes upon an intermediate electrode, combining the electrolytic products, separating the resulting compound from both electrolytes, and removing the compound from the cell, as set forth.

3. The electrolytic process of producing compounds, which consists in discharging ions of adjacent electrolytes upon an intermediate electrode, combining the electrolytic products, separating the resulting compound from both electrolytes, and washing out the compound from the cell, as set forth.

4. The electrolytic process of producing compounds, which consists in discharging ions of adjacent electrolytes upon an intermediate electrode, in the presence of a substance capable of oxidation by the anion and reduction by the cation, combining the electrolytic products, and separating the resulting compound from both electrolytes, as set forth.

5. The electrolytic process of producing compounds, which consists in discharging ions of adjacent electrolytes upon an intermediate electrode, in the presence of a substance capable of oxidation by the anion and reduction by the cation, combining the electrolytic products, separating the resulting compound from both electrolytes, and removing the compound from the cell, as set forth.

6. The electrolytic process of producing compounds, which consists in discharging ions of adjacent electrolytes upon an intermediate electrode, in the presence of a substance capable of oxidation by the anion and reduction by the cation, combining the electrolytic products, separating the resulting compound from both electrolytes, and washing out the compound from the cell, as set forth.

7. The electrolytic process of producing acids and alkalis, which consists in discharging the ions of alternate bodies of a salt solution and water upon intermediate electrodes, combining the anion of the salt and the cation of the water to produce an acid, combining the cation of the salt and the anion of the water to produce an alkali, and removing the resulting compounds from the cell, as set forth.

8. The electrolytic process, which consists in simultaneously discharging ions upon an electrode and electrolytically depolarizing that electrode, as set forth.

9. The process of depolarizing an electrode, which consists in electrolytically supplying a depolarizer to the electrode, and removing the product of the reaction between the depolarizer and the ions of the electrolyte, as set forth.

10. The process of depolarizing the electrodes of an electrolytic cell, which consists in electrolytically and simultaneously supplying a depolarizer to two electrodes of different potential, as set forth.

11. The process of depolarizing the electrodes of an electrolytic cell, which consists in electrolytically and simultaneously supplying a depolarizer to two electrodes of different potential, and removing the products of reaction from the cell, as set forth.

12. The electrolytic process of producing compounds, which consists in interposing a body of an electrolyte between two bodies of another electrolyte or electrolytes, electrolyzing one electrolyte, and utilizing the electrolytic products to effect decomposition of the other electrolyte or electrolytes, as set forth.

13. The electrolytic process of producing compounds, which consists in interposing a body of an electrolyte between two bodies of another electrolyte, electrolyzing one electrolyte, and combining the discharged ion or ions or ion products with an ion or ions or ion products of the other electrolyte, as set forth.

14. The electrolytic process of producing compounds, which consists in interposing a body of an electrolyte between two bodies of another electrolyte, electrolyzing one electrolyte, combining the discharged ion or ions or ion products with an ion or ions or ion products of the other electrolyte, and removing the resulting compounds from the cell, as set forth.

15. The electrolytic process of producing acids and alkalis, which consists in interposing an electrolyte comprising the combined acid and alkali between two bodies of water, electrolyzing one or more of said bodies, combining the anion of the electrolyte and the cation of the water to produce an acid, combining the cation of the electrolyte and the anion of the water to produce an alkali, and removing the resulting compounds from the cell, as set forth.

16. The electrolytic process of producing acids and alkalis, which consists in interposing a body of water between two electrolytes comprising the combined acid and alkali, electrolyzing one or more of said bodies, combining the anion of the electrolyte and the cation of the water to produce an acid, combining the cation of the electrolyte and the anion of the water to produce an alkali, and removing the resulting compounds from the cell, as set forth.

17. An electrolytic cell, comprising end compartments containing electrodes, and a plurality of intermediate compartments separated from each other and from the end compartments by porous diaphragms.

18. An electrolytic cell, comprising a series of compartments separated by diaphragms and bipolar electrodes, and an anode and cathode in the end compartments.

19. An electrolytic cell, comprising a series of compartments, permeable bipolar electrodes between adjacent compartments, an anode and cathode in the end compartments; and means for isolating the reaction products at said bipolar electrodes.

20. An electrolytic cell, comprising a series of compartments, a pair of diaphragms and an intermediate bipolar electrode between adjacent compartments, and an anode and cathode in the end compartments.

21. An electrolytic cell, comprising a series of compartments, a pair of diaphragms and an intermediate permeable bipolar electrode between adjacent compartments, and an anode and cathode in the end compartments.

In testimony whereof I affix my signature in presence of two witnesses.

EUGENE A. BYRNES.

Witnesses:
C. A. NEALE,
J. B. HILL.